United States Patent
Gallet et al.

(10) Patent No.: US 9,383,796 B2
(45) Date of Patent: Jul. 5, 2016

(54) MANAGEMENT OF THE INTERACTION BETWEEN SECURITY AND OPERATING SYSTEM POWER MANAGEMENT UNIT

(75) Inventors: Gilles Gallet, Ampuis (FR); Pierre Philippe, Grenoble (FR); Laurent Morel, Grenoble (FR); Anne Morel-Trinquet, Grenoble (FR)

(73) Assignee: ST-Ericsson SA, Plan-les-Ouates (CH)

( * ) Notice: Subject to any disclaimer, the term of this patent is extended or adjusted under 35 U.S.C. 154(b) by 266 days.

(21) Appl. No.: 14/124,784

(22) PCT Filed: Jun. 6, 2012

(86) PCT No.: PCT/EP2012/060769
§ 371 (c)(1),
(2), (4) Date: Feb. 18, 2014

(87) PCT Pub. No.: WO2012/168339
PCT Pub. Date: Dec. 13, 2012

(65) Prior Publication Data
US 2014/0201548 A1    Jul. 17, 2014

Related U.S. Application Data

(60) Provisional application No. 61/505,906, filed on Jul. 8, 2011.

(30) Foreign Application Priority Data

Jun. 10, 2011    (EP) ..................................... 11305739

(51) Int. Cl.
*G06F 1/32*    (2006.01)
*G06F 1/26*    (2006.01)
(Continued)

(52) U.S. Cl.
CPC ................ *G06F 1/32* (2013.01); *G06F 1/3203* (2013.01); *G06F 1/3234* (2013.01); *G06F 9/4418* (2013.01); *G06F 13/1663* (2013.01);
(Continued)

(58) Field of Classification Search
CPC . G06F 1/3234; G06F 13/1663; G06F 9/4418; G06F 9/54; G06F 9/544
USPC ........... 713/320, 323; 711/147; 719/312, 318, 719/319
See application file for complete search history.

(56) References Cited

U.S. PATENT DOCUMENTS 5,726,921 A    3/1998    Krick
7,966,459 B2*  6/2011    Nussbaum .............. G06F 9/466
                                             711/147

(Continued)

FOREIGN PATENT DOCUMENTS

EP    0824233 A2    2/1998

*Primary Examiner* — Ji H Bae
(74) *Attorney, Agent, or Firm* — Coats & Bennett, P.L.L.C.

(57) ABSTRACT

The present invention relates to a method of controlling the operation of a processing device in a first mode or in a second mode. The processing device has a first execution environment and a second execution environment. The method comprises, upon detection of a switch between said first and second modes, setting in the first execution environment a value of a shared variable to an initial value, upon detection of a request of execution of instructions in the second execution environment, updating the value of said shared variable to a value different from the initial value, and reading a current value of the shared variable and causing the processing device to operate in the first mode or in the second mode depending at least on the current value of the shared variable.

14 Claims, 2 Drawing Sheets

(51) Int. Cl.
*G06F 12/00* (2006.01)
*G06F 13/00* (2006.01)
*G06F 9/44* (2006.01)
*G06F 13/16* (2006.01)
*G06F 21/74* (2013.01)
*G06F 21/00* (2013.01)
*G06F 9/54* (2006.01)

(52) U.S. Cl.
CPC ............... *G06F21/00* (2013.01); *G06F 21/74* (2013.01); *G06F 9/54* (2013.01); *G06F 9/544* (2013.01)

(56) References Cited

U.S. PATENT DOCUMENTS

| | | | |
|---|---|---|---|
| 2004/0158727 A1* | 8/2004 | Watt | G06F 9/30123 713/193 |
| 2006/0090084 A1* | 4/2006 | Buer | G06F 21/53 713/189 |
| 2007/0055897 A1 | 3/2007 | Bussan et al. | |
| 2007/0283146 A1* | 12/2007 | Neveux | G06F 21/74 713/166 |
| 2010/0122088 A1* | 5/2010 | Oxford | G06F 21/10 713/168 |

* cited by examiner

MANAGEMENT OF THE INTERACTION BETWEEN SECURITY AND OPERATING SYSTEM POWER MANAGEMENT UNIT

TECHNICAL FIELD

The present invention generally relates to devices and methods for the management of interactions between a secure environment on a chip and the operating system power management unit. It concerns more particularly the decision of switching between an active mode and a low-power mode of operation.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

A System-on-Chip (SoC) platform typically comprises at least one embedded Central Processing Unit (CPU), at least one embedded functional unit (also called an IP in the jargon of the one with ordinary skills in the art) which may be a memory (for instance of the eSRAM type), a Memory Management Unit (MMU), and/or at least one register. The components of the SoC are typically interconnected through an internal bus matrix.

In operation, the SoC platform may be led to manipulate sensitive data, for instance, cryptographic secret keys or unencoded secret data like passwords. To prevent unauthorized access to and/or corruption of these sensitive data, the architecture of the SoC platform may be split into two physically and functionally separated environments: a secure environment for manipulating sensitive data and a public environment for processing non-sensitive data. The secure environment comprises notably one or more dedicated secure memories and/or one or more secure hardware registers to store sensitive data, whereas the public environment may include its own dedicated memories and/or hardware registers to store public data.

This separation is for example implemented by Advanced RISC Machine (ARM) SoC platforms with security extensions, for example the TrustZone technology. A clear frontier between these two environments may be implemented with hardware (HW) and/or software (SW) mechanisms embedded in the processor, in the bus matrix, and in the IPs themselves. This frontier ensures that secure data within the secure environment cannot be accessed by any public component belonging to the public environment. This may typically be the case for active modes of operation of the platform, wherein memories, IPs and processors are kept powered-on or in retention. However, some modes of operation are available wherein one or more of the secure components can be powered off, meaning that at least some of their contents have to be saved during the particular mode and be restored thereafter. Such modes may be available for the purpose of optimizing the power strategy of the chip and decrease energy leakages.

A dedicated persistent secure memory, included in the secure environment, may be used to store securely sensitive data present in the secure environment before switching from an active mode to an energy saving mode (low-power mode). However, there might be cases where not enough secure memory space is available to save all secure contents. Consequently, in such cases, it may be necessary to store sensitive data outside the secure environment, in a non secure storage for example. It may be desirable that such storage can be made efficiently and securely.

Storing such data can have impacts on the delay to switch from one mode to another.

One issue of switching from an active mode to a low-power mode is linked to performances and integration inside the operating system (OS). Indeed, this switching could require a non-negligible amount of time due to saving/storing/restoring sensitive information from or to the memory.

As the power driver, usually enabled in the public environment, is isolated from the secure environment, the decision to go or not in low-power mode is made independently from the knowledge of the estimated time to save/restore sensitive data.

Thus, this insufficient knowledge could be quite significant for the global power policy and could affect directly the efficiency of this policy.

Thus, embodiments of the present invention aim at solving at least some of the following problems:
Ensuring that the power driver is able to decide to go or not in a low-power mode with an efficient strategy;
Avoiding that this efficiency is costly regarding code footprint or performances.

SUMMARY

To address these needs, a first aspect of the present invention relates to a method of managing the operation of a processing device in a first mode or in a second mode, the processing device having a first execution environment and a second execution environment. At least the second execution environment is configured to be requested to execute instructions and to execute the instructions.

The method comprises:
upon detection of a switch between said first and second modes, setting in the first environment a value of a shared variable to an initial value,
upon detection of a request of execution of instructions in the second environment, updating the value of said shared variable to a value different from the initial value, and
reading a current value of the shared variable and causing the processing device to operate in the first mode or in the second mode depending at least on said current value of the shared variable.

The noun "variable" is a generic way to refer to storage of information. A variable could be, for instance, a memory space in a hard-drive or in RAM (for "Random Access Memory") or a register of a microprocessor (or microchip) or a memory-mapped area.

For instance, the first execution environment is a public environment whereas the second environment is a secure environment.

Additionally, the first mode is, for instance, an active mode where as the second mode is a low-power mode as detailed above.

The second environment is configured to dynamically load applications and/or programs and, thus being able to execute instructions (i.e. binary codes, interpretable script, etc.).

This embodiment aims at ensuring that the first environment has all the information needed to decide if the switch to the other mode is relevant considering the power strategy of the processing device.

A switch between the first and second modes is either:
the switch from the first mode to the second,
the switch from the second mode to the first,
or both switch from any mode to the other.

As the execution of instructions in the second environment is often closely related to the modification of a secure memory, it is useful to only supervise the executions of instructions. This supervision is simpler to implement than the supervision of the modification of a secure memory.

According to another embodiment, the updating of the value of the shared variable may be performed prior to any execution of instructions by the second environment.

Hence, it is possible to modify a preexisting processing device to easily implement the present method. A single piece of code can be written in an application selector which receives all the execution requests in the second environment. Thus, the code footprint can be minimal and it can be unnecessary to modify all possible loaded applications to be sure that the update of the shared variable can occur.

According to another embodiment, the value of the shared variable can be set at least to a first and to a second value, the first value being the initial value. The value of the shared variable can be updated to the second value upon detection of a request of execution of instructions in the second environment.

For instance, the shared variable can be of Boolean type.

For instance, its value can be set to 'true' if previously it was 'false' (or to 'false' if previously it was 'true'). This embodiment aims at ensuring a very straight forward implementation of the present method. Consecutively, if at least one execution is requested in the second environment, the value of the shared variable can be set to 'true'.

According to another embodiment, the value of the shared variable may be an integer and may be incremented upon detection of a request of execution of instructions in the second environment.

This embodiment aims, for instance, at ensuring that the number of code execution requests can be known by the first environment. This information can ensure that the decision to switch is as relevant as possible.

According to another embodiment, the value of the shared variable can be set to a plurality of possible values, the number of the possible values being an integer. The value of the shared variable is updated with one of the possible values upon detection of a request of execution of instructions in the second environment.

For instance, the initial value of the shared variable can be set to the string "not called", and the possible values are the set of strings: "called once", "called less than 5 times", "called more than 5 times".

Hence, the public environment is able to determine an estimation of the modification of the secure memory and consecutively, to determine the time needed to switch to a low-power mode.

According to another embodiment, the request of execution of instructions may comprise a synchronous call.

Hence, a direct call by the operating system for instance can be supervised. For instance, a synchronous call may be a simple function call with arguments and return value.

According to another embodiment, the request of execution of instructions may comprise instead an asynchronous call.

Hence, interruptions for instance can be supervised. For instance, an asynchronous call may be generated by a secure timer or another secure hardware.

A second aspect relates to a processing device, being able to be switched from a first mode of operation to a second mode. This processing device comprises a first execution environment and a second execution environment. The second execution environment is configured to:
to be requested to execute instructions,
to execute the instructions,
upon detection of a switch between said first and second modes, set in the first environment a value of a shared variable to an initial value,
upon detection of a request of execution of instructions in the second environment, update the value of said shared variable to a value different from the initial value.

The first execution environment is configured to:
read a current value of said shared variable and deciding whether to make the processing device operate in the first mode or in the second mode according to at least the value of the shared variable.

A third aspect relates to an electronic apparatus comprising a processing device as described above. An electronic apparatus can be for instance a mobile phone, a smart phone, a PDA (for "Personal Digital Assistant"), a touch pad, or a personal stereo.

A fourth aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

In order to optimize the communication between the public environment and the secure environment of a processing device, the invention proposes for instance to identify all entries inside the secure environment (i.e. the synchronous call and the asynchronous call), and to communicate this information to public environment so that a power controller could have a precise information about how long the next power mode switching will last. This method enables to dynamically determine the cost (in time and energy for instance) of the low-power mode entry/exit versus a given budget. In order to illustrate this statement, a processing device according to two possible modes of the invention is presented in FIG. 1 and in FIG. 2.

Figure 1:
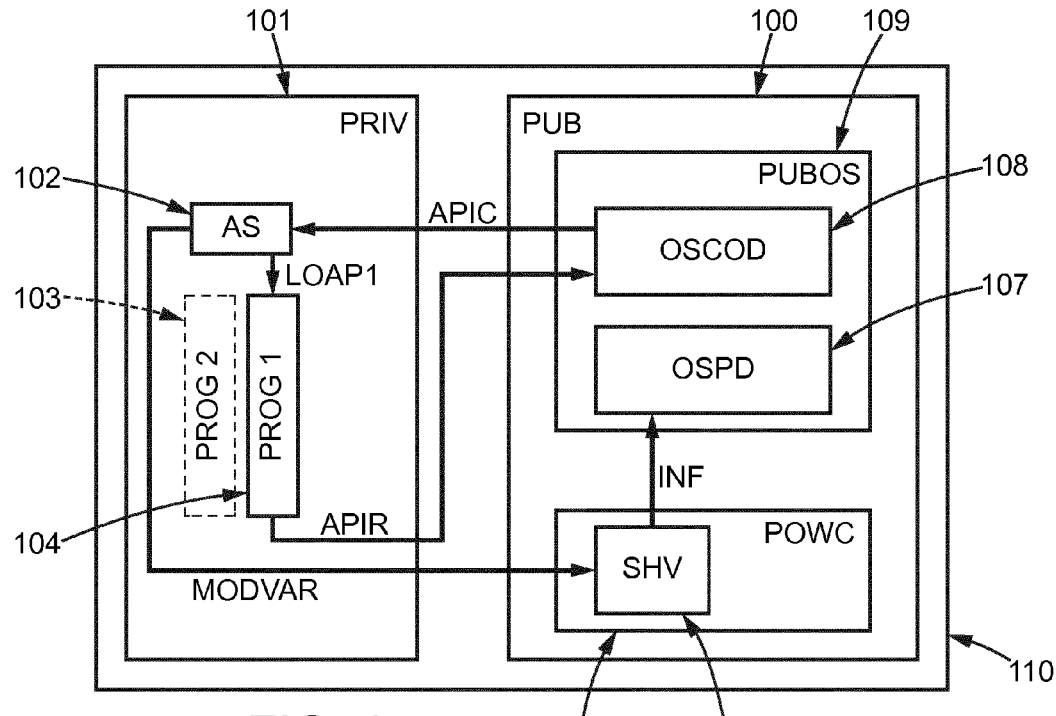
FIG. 1 is a possible data flow for processing a synchronous call in a processing device enabling a secure and a public environment.

In the processing device 110 presented in FIG. 1, two isolated environments are enabled:
a secure environment 101, and
a public environment 100.

These two environments are separated due to security reasons and only few interactions are allowed between these two environments in order to minimize the possibility of security leaks and of attacks.

Usually, the public environment is formed at least by a public operating system 109 in charge of the usual functionality of the device (such as the interaction with the users, the display, etc.) and a power controller 105. This power controller 105 is designed to handle the transitions between a plurality of operational modes of the processing device. An example of possible enablement of a processor unit can be found in the application EP10191115. The power controller 105 comprises also a shared variable 106, located in the public memory. This memory (and the variable 106) is accessible from the public operating system 109.

The public operating system comprises a core program 108 and several drivers to interact with other devices and interfaces such as the operating system power driver 107 (which interacts with the power controller 105).

The secure environment comprises at least an "application selector" 102 and a plurality of programs (103 and 104) which can be loaded dynamically by the application selector depending on the context and needs.

In order to clarify the interactions between the previously introduced components, it is proposed to consider that the operating system core system 108 needs to perform a security process and thus make a synchronous call (arrow APIC) to the secure environment API (for "Application Programming Interface").

Synchronous calls can be, for instance, a call for a operating system program which needs to verify a password of a user (by calling a function checkUserPassword[$pass] for instance) or to encrypt/decrypt a file.

The application selector 102 is arranged to decide which program is to be executed and load consequently the appropriate one (in the example shown in FIG. 1, the appropriate program is the PROG1 104) for execution (arrow LOAP1). In parallel, the application selector 102 is further arranged to inform the power controller 105 that a code execution is occurring into the secure environment, by modifying the shared variable 106 (arrow MODVAR). This modification can be:
  setting the shared variable to a Boolean value such as "true" in order to indicate whether code has been executed into the secure environment;
  setting the shared variable to a value in a list of possible values (such as "modified", "moderately modified", "substantially modified", "not modified") in order to indicate whether the secure memory is supposed to be modified;
  incrementing the value of the shared variable to indicate the number of time that a code has been executed into the secure environment.

In case of incrementing, the higher the value of the shared variable is, the higher the probability of the modification of the secure memory is.

It is also possible to modify the shared variable 106 directly from the operating system code 108. The centralized modification by the application selector 102 is advantageous as this modification can be reused in slightly similar cases such as the one presented in the FIG. 2.

Consecutively, reading the shared variable 106 allows the operating system power driver 107 determining (arrow INF) at any time, whether a code execution has occurred in the secure environment.

Instead of updating the shared variable 106 whenever code execution occurred into the secure environment, it is also possible to update this variable when the secure memory is modified. Nevertheless, it is advantageous to monitor only the code execution since the code execution into the secure environment induces in most cases a secure memory modification and since it is straighter forward to implement this type of monitoring. In the present case of the FIG. 1, the code footprint caused by updating the shared variable is only concentrated in the application selector 102 and no code modification is needed in the plurality of program (103 and 104). In addition, the secure environment is often composed of one fixed framework, which is embedded in the chip, and from programs which might be dynamically loaded. The behaviour of these programs is unknown when designing the chip. Thus, there is no knowledge about what will be done regarding secure memory modification and it could be impossible to modify them before integrating them into the secure environment.

At the end of the execution of the code into the secure environment, a return value is sent back to the public operating system code (arrow APIR).

Figure 2:
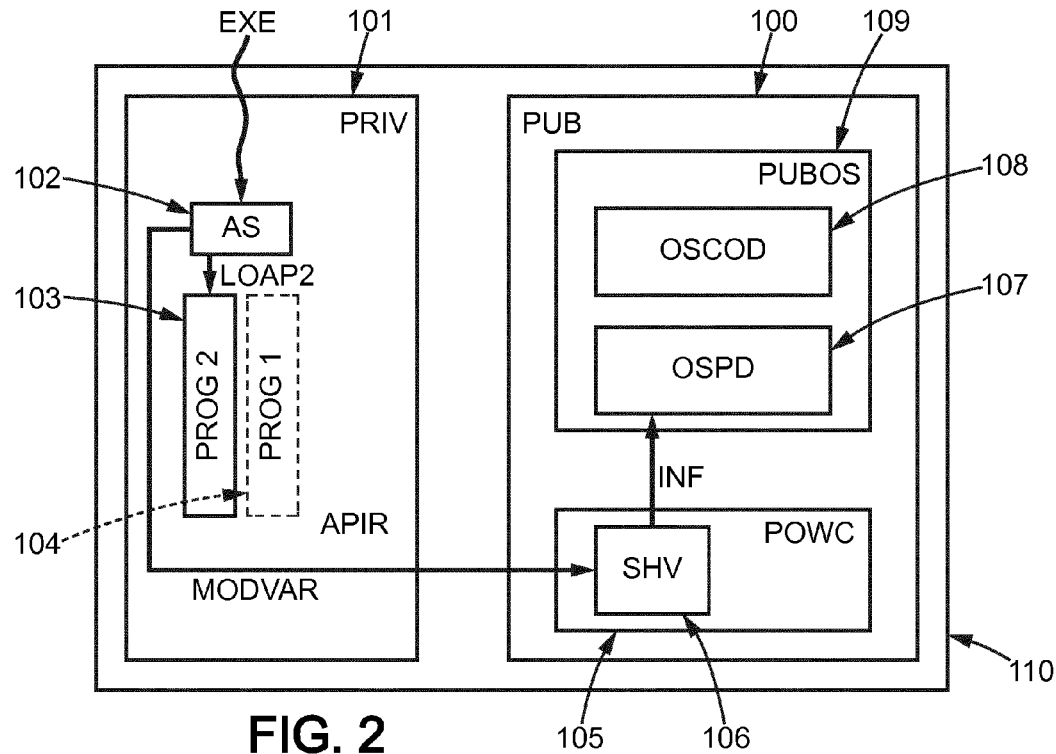
FIG. 2 is a possible data flow for processing an asynchronous call in a processing device enabling a secure and a public environment.

FIG. 2 represents the same processing device as described in FIG. 1, but in this FIG. 2, the processing device executes an asynchronous call (arrow EXC).

Asynchronous calls can be (for instance) interruptions or exceptions triggered by a security hardware or a secure clock. It is stressed that the operating system code 108 is not aware of these asynchronous calls as they are not originating from the operating system code.

The application selector 102 decides, upon reception of this asynchronous call, which program is to be executed and load consequently the appropriate one (for instance, in the FIG. 2, the appropriate program is the PROG2 103) for execution (arrow LOAP2).

The following execution is quasi identical to the execution described in the FIG. 1, except that no return value is sent back to the operating system code, as the execution is not initiated by it (arrow APIR in FIG. 1).

Therefore, by identifying all entries inside the secure environment (asynchronous or synchronous calls), it is possible to communicate information to the operating system power driver so that this driver has precise information about how long the next low-power mode entry will last.

Figure 3:
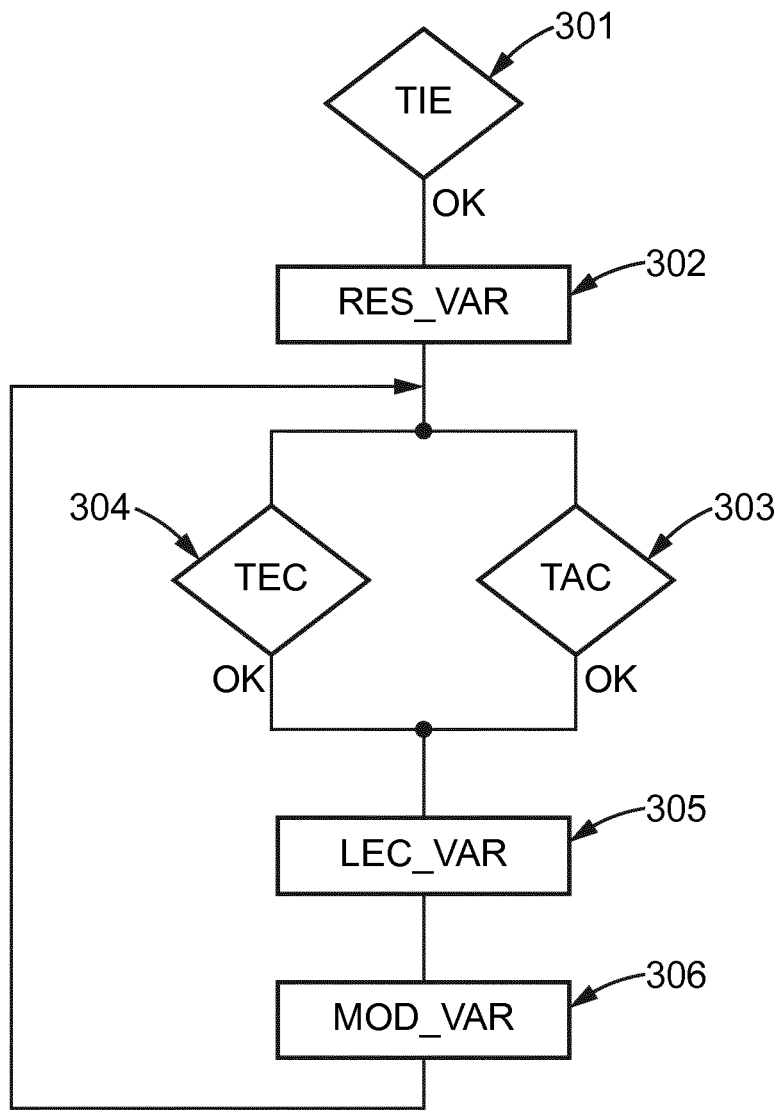
FIG. 3 is an example of a flow chart illustrating steps of a process to manage the interaction between a secure and a public environment of a processing device.

FIG. 3 is an example of a flow chart illustrating steps of a process (implemented in the application selector 102) to manage interactions between the secure environment 101 and the power controller 105 in the public environment.

This flow chart can represent steps of an example of a computer program which may be executed by the application selector 102.

In step 301, the application selector tests if the processing device has just entered the low-power mode or the active mode. In such cases, the shared variable is reset. This reset (step 302) is for instance the initialisation of the shared variable to the value "0" (if the shared value is of numeric type) or to the value "false" (if the shared value is of Boolean type).

Then, the application selector turns into an idle mode, waiting for a synchronous call or an asynchronous call.

When the application selector is solicited by a synchronous call (step 303) or an asynchronous call (step 304), the application selector reads the shared variable (step 305) and depending on its value, modifies it (step 306). This modification comprises for instance the increment of the shared variable (if the shared variable is of numeric type) or the updating of the shared variable to the value "true" (if the shared variable is of Boolean type).

It is noted that if the shared value is of Boolean type, there is no need to read the shared variable before modifying it: the shared value is only updated to "true" for instance.

Steps 304 to 306 are repeated while the processing device is in an active mode.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method of controlling operation of a processing device in a first power mode or in a second power mode, the processing device having a public execution environment and a separate secure execution environment, wherein at least the secure execution environment is configured to be requested to execute instructions and to execute the instructions, the method comprising:
    upon detection of a switch between the first and second power modes, setting in the public execution environment a value of a shared variable to an initial value;
    upon detection of a request to execute instructions in the secure execution environment, updating the value of the shared variable to a value different from the initial value; and
    reading a current value of the shared variable and causing the processing device to operate in the first power mode or in the second power mode depending at least on the current value of the shared variable.

2. The method of claim 1, wherein the updating of the value of the shared variable is performed prior to the secure execution environment executing the instructions.

3. The method of claim 1:
    wherein the value of the shared variable can be set at least to a first and to a second value, the first value being the initial value; and
    wherein the value of the shared variable is updated to the second value upon detection of a request to execute instructions in the secure execution environment.

4. The method of claim 3, wherein the shared variable is a Boolean variable.

5. The method of claim 1, wherein the value of the shared variable is an integer, and is incremented upon detecting a request to execute instructions in the secure execution environment.

6. The method of claim 1:
    wherein the value of the shared variable can be set to a plurality of possible integer values; and
    wherein the value of the shared variable is updated with one of the possible integer values upon detecting a request to execute instructions in the secure execution environment.

7. The method of claim 1, wherein the request to execute instructions comprises a synchronous call.

8. The method of claim 1, wherein the request to execute instructions comprises an asynchronous call.

9. A processing device, comprising one or more processing circuits operative to switch between a first power mode of operation and a second power mode of operation, and to provide a public execution environment and a separate secure execution environment, the one or more processors being configured via programming to:
    operate the secure execution environment to:
        receive a request to execute instructions;
        execute the instructions based on the received request;
        upon detection of a switch between the first and second power modes of operation, set in the public execution environment a value of a shared variable to an initial value;
        upon detection of the request to execute instructions in the secure execution environment, update the value of the shared variable to a value different from the initial value; and
    operate the public execution environment to read a current value of the shared variable and decide whether to make the processing device operate in the first power mode or in the second power mode of operation according to at least the read value of the shared variable.

10. The processing device of claim 9, wherein the one or more processors are further configured via programming to operate the secure execution environment to update the value of the shared variable prior to executing the instructions.

11. The processing device of claim 9, wherein one or more processors are further configured via programming to operate the secure execution environment to:
    set the value of the shared variable to either a first or a second value, the first value being the initial value; and
    update the value of the shared variable to the second value upon detection of a request to execute instructions in the secure execution environment.

12. The processing device of claim 9, wherein the one or more processors are further configured via programming to operate the secure execution environment to:
    increment the value of the shared variable upon detection of a request to execute instructions in the secure execution environment;
    wherein the value of the shared variable is an integer.

13. The processing device of claim 9, wherein the one or more processors are further configured via programming to operate the secure execution environment to receive a request to execute instructions with either an asynchronous call or a synchronous call.

14. A computer program product stored in a non-transitory computer-readable medium, the computer program product comprising software instructions for a processing device having first and second power modes of operation, and having a public execution environment and a separate secure execution environment, wherein execution of the software instructions by one or more processing circuits of the processing device configures the processing device to:

upon detection of a switch between the first and second power modes, set in the public execution environment a value of a shared variable to an initial value;

upon detection of a request of to execute instructions in the secure execution environment, update the value of the shared variable to a value different from the initial value; and read a current value of the shared variable and cause the processing device to operate in the first power mode or in the second power mode depending at least on the current value of the shared variable.

* * * * *